Jan. 9, 1945. E. L. ROOFE 2,366,806
ROTATABLE CENTER FOR LATHES AND GRINDERS
Filed Sept. 21, 1942

E. L. ROOFE
INVENTOR.

BY Lester B. Clark
Ray L. Smith
ATTORNEYS

Patented Jan. 9, 1945

2,366,806

UNITED STATES PATENT OFFICE 2,366,806

ROTATABLE CENTER FOR LATHES AND GRINDERS

Elmer L. Roofe, Houston, Tex.

Application September 21, 1942, Serial No. 459,082

1 Claim. (Cl. 82—33)

The invention relates to a center point for lathes and grinders which is adapted to sustain exceptionally heavy loads and which will permit high speed rotation of the work.

The usual center point which is non-rotatable is of particular disadvantage when heavy pieces are being handled or when the speed of rotation is high because of the fact that the tremendous friction between the point and the work causes burning.

Various types of rotatable center points have been heretofore devised but all of these have had certain disadvantages in failing to absorb a thrust sufficient to support the load of the work or failing to accurately align the center point and prevent wiggle therein.

It is therefore one of the objects of the present invention to provide an exceptionally heavy duty center point capable of sustaining loads of approximately 60,000 pounds at high speed.

Another object of the invention is to provide a rotating center point which absorbs the thrust, maintains alignment and is capable of running in a bath of oil.

Another object of the invention is to provide a double, combination thrust and radial bearing for taking the load and maintaining alignment in a rotating center point.

Still another object of the invention is to provide a lighter duty rotating center point where the thrust, radial and tail bearings are compactly arranged.

Another object of the invention is to provide a ball bearing center point wherein the tail bearing is disposed in the head of the socket.

Still another object of the invention is to provide a bull nose rotating center point wherein the thrust and alignment bearings are compactly arranged inside of the bull nose.

Other and further objects of the invention will be readily apparent when the following description is considered in connection with the accompanying drawing wherein.

Figure 1:
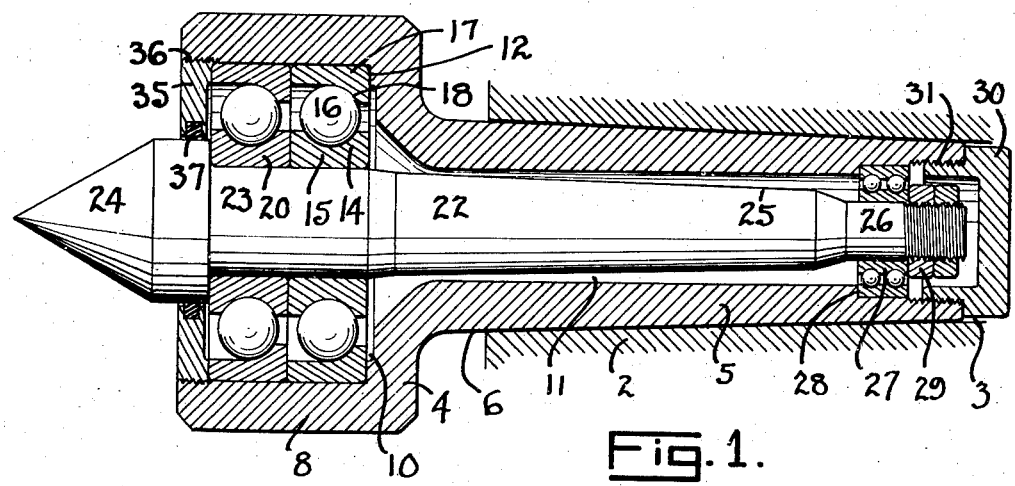
Fig. 1 is a vertical sectional view of a substantially heavy duty center point illustrating the construction and arrangement of the center point bearing and socket.

In Fig. 1 the tail stock or ram thereof, as the case may be, is illustrated generally at 2 and has the usual recess 3 therein to receive the center point construction. The center point is made up of a body or socket 4 having a shank 5 whose periphery 6 is provided with a Morse taper so as to provide a fit with the recess 3. A head 8 forms a part of the socket 4 and is considerably enlarged as best seen in Fig. 1.

This form of center point in Fig. 1 is an exceptionally heavy duty construction and is capable of supporting loads of 60,000 pounds. In order to accomplish this a sturdy, rigid structure is necessary and to this end the head is hollowed out to provide a recess 10 and the shank 5 is also hollow to provide an elongated recess 11.

A shoulder 12 is arranged in the recess 10 adjacent the base thereof and this shoulder is arranged to receive the combination thrust and radial bearing 14. This bearing is made up of the inside race 15, ball bearings 16 and the outer race 17 which has the thrust shoulder 18 thereon. In order to provide for exact alignment of the center point another bearing 20 is provided which is identical with the bearing 14 and surmounts the bearing 14 so that there is a double support for the center spindle 22. These bearings 14 and 20 are firmly fitted upon the cylindrical periphery 23 of the spindle directly behind the enlarged center point head portion 24.

The tail portion 25 of the spindle is reduced at 26 and carries a double row anti-friction tail bearing 27. This bearing is arranged to abut a shoulder 28 in the recess 11 and is confined on the reduced portion 12 of the center point shank by one or more retainer nuts 29. The end of the shank 5 is closed by a cap 30 which is threaded at 31 into the tapered end of the recess 11.

Around the head 24 of the center point a plate or retainer member 35 is threaded at 36 into the recess 10. This plate carries a suitable packing 37 to form a seal about the rotating center point spindle 22. This plate will be suitably threaded into position to firmly confine the bearings 14 and 20 to form a seal with the spindle 22 and to confine any lubricant which may be positioned in the recesses 10 and 11.

In view of the fact that the center point can be assembled and is a complete unit in and of itself, it seems clear that the recess can be filled with lubricant so that all of the bearings run in oil. This is of particular advantage because it voids wear and misalignment of the parts.

The positioning of the tail bearing a substantial distance from the thrust bearings lends itself to more accurate alignment, prevents wiggle of the center point and the fact that the center point is rotatable in bearings running in oil permits exceptionally high speeds of rotation of the work.

As above indicated center points constructed in accordance with the foregoing description have been made and actually used and have supported loads of 60,000 pounds at high speed. This constitutes a substantial advance over other similar devices available on the market.

Figure 2:
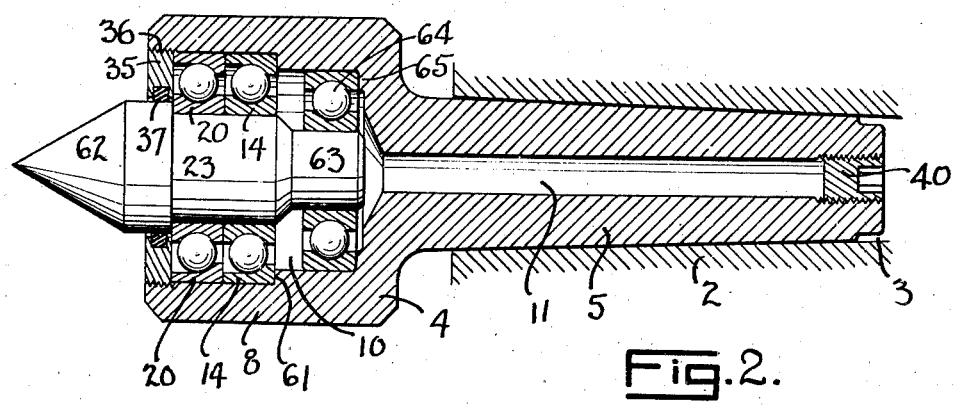
Fig. 2 is a vertical sectional view of a somewhat lighter duty rotating center point wherein all of the bearings are compactly arranged in the head of the socket.

Fig. 2 shows a modified form of the center point which is arranged for lighter loads approximating 20,000 or 30,000 pounds and is of slightly different construction. The recess 3 in the ram or tail stock is slightly smaller than in Fig. 1 and accordingly the shank 5 of the tail stock 4 is correspondingly smaller, in fact, the recess 11 is of such size that it does not permit the center point spindle to extend thereinto and is closed by a plug 40 threaded into the rear end thereof. The head 8 is modified somewhat as compared with Fig. 1 and has a shoulder 61 intermediate the ends of the recess 10 which receives the combination radial and thrust bearings 14 and 20 which are the same as the bearings described in Fig. 1 except that they are somewhat smaller in size. The center point 62 is somewhat different in that beyond the cylindrical periphery 23 which carries the bearings 14 and 20, the spindle is reduced at 63 to receive the tail bearing 64. This bearing is a radial ball bearing and is arranged to abut the seat 65 in the base of the recess 10. In view of the fact that the center point of Fig. 2 is not intended for as heavy duty as that of Fig. 1, the tail bearing has been positioned rather close to the main thrust bearing and a suitable alignment of the center point still maintained. The plate 35 and packing 37 are the same as previously described.

Particular attention is directed to the fact that the two bearings 14 and 20 in each of the modifications of the center point are independent bearings. Each can rotate independently of the other and this avoids any marking of the work due to the fact that the bearings may be rotated together as is the usual practice. This type of bearing is generally known to the trade as a duplex bearing. They may be ground and marked in pairs for installation.

Figure 3:
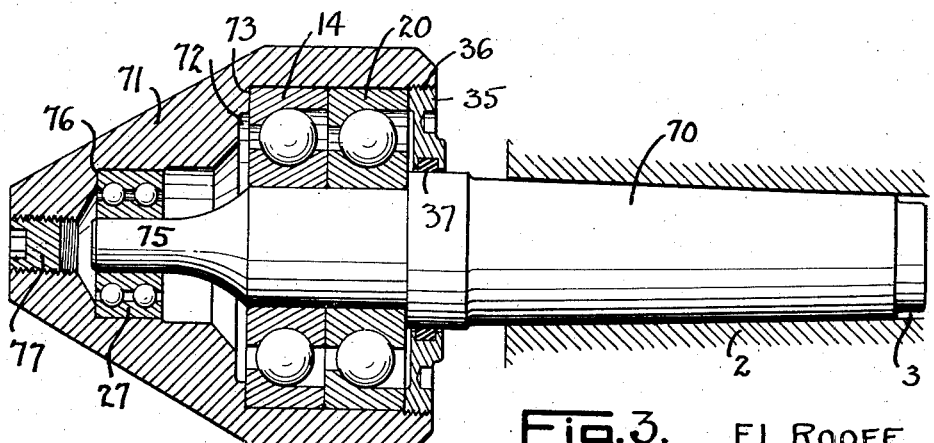
Fig. 3 is a side elevation of a bull nose type of center point wherein the bull nose and barings are shown in section.

Fig. 3 shows a bull nose, cone or bell type of rotating center wherein the recess 3 in the ram or tail stock receives the shank 70 of the center point spindle. The bearing construction of Fig. 2 has been somewhat reduced in that the bull nose, cone or bell portion 71 is provided with a recess 72 and shoulder 73 to receive the bearings 14 and 20 as well as the closure plate 35 and packing 37. The spindle 70 is reduced at 75 to receive a double row anti-friction tail bearing 76. In this construction the tail bearing is in addition to the main bearing due to the length of the bull nose 71 and tends to keep the nose in alignment. A plug 77 closes the forward end of the bull nose and would tend to confine a body of lubricant therein.

All forms of the center point permit lubricant or oil to be confined therein so that the bearings run in oil. This oil can be admitted thru any of the plugs shown or it can be admitted thru a special oil hole or plug not shown.

A lubricated rotatable type of center point herein described permits considerably higher speeds in turning and grinding operations without burning of the center points and while maintaining alignment and avoiding wiggle. These ball bearing center points are more accurate under load and permit three or four times the speed of rotation of the work. While it is possible that the provision of the head structure of this rotating point occupies a slightly additional length as compared with the conventional non-rotating center point, it seems obvious that the ram of the tail stock need not be run out quite as far when a roating center point is used. This arrangement lends itself to stability and alignment because the closer the point of support to the tail stock, the better. The socket of the present center point is sturdier and rigid and avoids wiggle and serves to hold the center point in proper alignment.

Broadly the invention contemplates a heavy duty rotating center point wherein suitable bearings provide for alignment to prevent wiggling of the center point.

What is claimed is:

A heavy duty center point for lathes and grinders including a socket having a hollow tapered shank to fit the tail stock and an enlarged hollow head, an interior shoulder joining said head and the inside of said shank, a pair of identical combination thrust and radial bearings disposed one against the other upon said shoulder, a center point having a flange to abut the outer bearing and a straight spindle to extend through both of said bearings and into said shank, a shoulder at the tail of said shank, a tail bearing thereon supporting the spindle tail, means threaded onto the spindle tail to load all of said bearings by tightening thereon to accurately position said center point in the bearings, means to close the tail of said shank and enclose said last means, and a closure for said head including a single annular plate threaded into said head to abut the outer of said bearings, and a packing ring carried by the inner periphery of said plate and sealing with the periphery of said flange so that the interior of the socket may retain lubricant in which said bearings may run.

ELMER L. ROOFE.